(12) United States Patent
Biskeborn et al.

(10) Patent No.: US 11,031,031 B2
(45) Date of Patent: Jun. 8, 2021

(54) FORMING RECESSED PORTIONS IN A TAPE HEAD MODULE TO PROVIDE AN AIR BEARING BETWEEN A TAPE MEDIUM AND A TAPE BEARING SURFACE OF THE TAPE HEAD MODULE

(71) Applicant: INTERNATIONAL BUSINESS MACHINES CORPORATION, Armonk, NY (US)

(72) Inventors: Robert Biskeborn, Hollister, CA (US); Calvin S. Lo, Saratoga, CA (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 327 days.

(21) Appl. No.: 15/968,144

(22) Filed: May 1, 2018

(65) Prior Publication Data

US 2019/0341071 A1 Nov. 7, 2019

(51) Int. Cl.
*H04R 31/00* (2006.01)
*G11B 5/187* (2006.01)

(52) U.S. Cl.
CPC ....... *G11B 5/1871* (2013.01); *Y10T 29/49021* (2015.01)

(58) Field of Classification Search
CPC ......... G11B 5/3169; G11B 5/187; G11B 5/23; G11B 5/232; Y10T 29/49021; Y10T 29/49043; Y10T 29/49052; Y10T 29/5101; Y10T 83/293; Y10S 83/921
USPC .............. 29/603.01, 603.07, 603.09, 603.12, 29/603.13, 603.15, 603.16, 603.18, 729
See application file for complete search history.

(56) References Cited

U.S. PATENT DOCUMENTS

| | | |
|---|---|---|
| 3,872,507 A | 3/1975 | Sano et al. |
| 5,224,641 A | 7/1993 | Spicer |
| 5,307,227 A | 4/1994 | Okada et al. |
| 5,774,306 A | 6/1998 | Wang et al. |
| 5,969,912 A | 10/1999 | Cope |
| 6,122,147 A | 9/2000 | Fahimi et al. |
| 6,282,055 B1 | 8/2001 | Lakshmikumaran et al. |
| 6,433,959 B1 | 8/2002 | Lakshmikumaran et al. |
| 6,690,542 B1 | 2/2004 | Wang |
| 7,154,691 B2 | 12/2006 | Girvin et al. |
| 7,271,983 B2 | 9/2007 | Saliba |
| 8,054,579 B2 | 11/2011 | Biskeborn |

(Continued)

OTHER PUBLICATIONS

Albrecht et al., "Magnetic Tape Head," IP.com, IPCOM000055057D, May 1980, pp. 2.

(Continued)

*Primary Examiner* — Thiem D Phan
(74) *Attorney, Agent, or Firm* — Konrad Raynes Davda & Victor LLP; David W. Victor; Alan S. Raynes

(57) ABSTRACT

Provided is a method for forming a tape head module having recessed portion to provide air bearing between a tape medium and a tape bearing surface of the tape head module. A module of the tape head has a first end, a second end opposite the first end, a first side and a second side, opposite the first side, between the first and the second ends, a tape bearing surface and a second surface, opposite the tape bearing surface, between the first end, the second end, the first side, and the second side. Material is removed from the tape bearing surface of the module to form a first recessed portion between the first end and before a region of the tape bearing surface having an array of transducers, and between the first side and the second side.

20 Claims, 13 Drawing Sheets

(56) References Cited

U.S. PATENT DOCUMENTS

| | | |
|---|---|---|
| 8,542,460 B2 | 9/2013 | Biskeborn et al. |
| 8,917,476 B2 | 12/2014 | Holmberg et al. |
| 8,958,175 B1 | 2/2015 | Lakshmikumaran et al. |
| 9,280,988 B1 | 3/2016 | Lakshmikumaran et al. |
| 10,490,211 B2 | 11/2019 | Biskeborn et al. |
| 2004/0228029 A1 | 11/2004 | Saliba |
| 2007/0183091 A1* | 8/2007 | Saliba .................. G11B 5/4893 360/122 |
| 2008/0024913 A1 | 1/2008 | Dugas |
| 2009/0135520 A1 | 5/2009 | Hachisuka |
| 2010/0073816 A1 | 3/2010 | Komori et al. |
| 2012/0008234 A1 | 1/2012 | Biskeborn et al. |
| 2019/0287555 A1 | 9/2019 | Biskeborn et al. |
| 2020/0020354 A1 | 1/2020 | Biskeborn et al. |

OTHER PUBLICATIONS

U.S. Appl. No. 15/924,109, filed Mar. 16, 2018.
List of IBM Patents or Patent Applications Treated as Related, dated May 1, 2018, pp. 2.
"What is Ion Milling?", AJA International Inc., [online][retrieved Feb. 18, 2018] pp. 3, http://www.ajaint.com/what-is-ion-milling.html.
Notice of Allowance dated Jul. 26, 2019, pp. 9, for U.S. Appl. No. 15/924,109.
Office Action dated Jan. 11, 2019, pp. 14, for U.S. Appl. No. 15/924,109, filed Mar. 16, 2018.
U.S. Appl. No. 16/581,604, filed Sep. 24, 2019.
Preliminary Amendment dated Sep. 24, 2019, pp. 8, for U.S. Appl. No. 16/581,604.
Office Action dated Apr. 17, 2020, pp. 21, for U.S. Appl. No. 16/581,604.
List of IBM Patents or Patent Applications Treated as Related dated Jun. 16, 2020, pp. 2.
Response dated Apr. 11, 2019, pp. 11, to Office Action dated Jan. 11, 2019, pp. 14, for U.S. Appl. No. 15/924,109, filed Mar. 16, 2018.
Response dated Jul. 17, 2020, pp. 9, to Office Action dated Apr. 17, 2020, pp. 21, for U.S. Appl. No. 16/581,604.
Notice of Allowance dated Sep. 29, 2020, pp. 11, for U.S. Appl. No. 16/581,604.

* cited by examiner

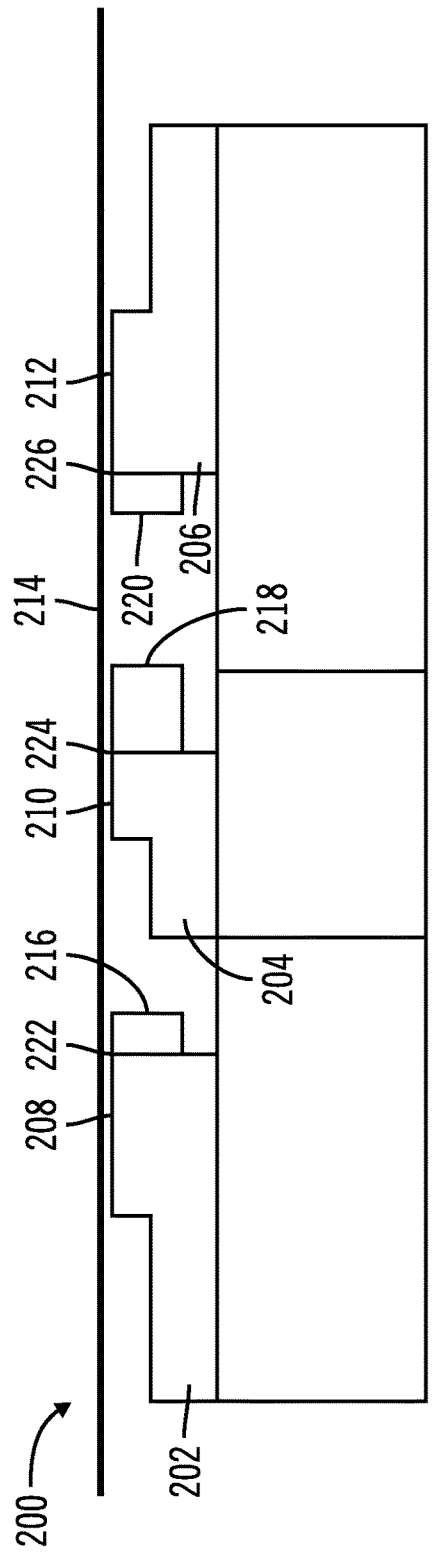
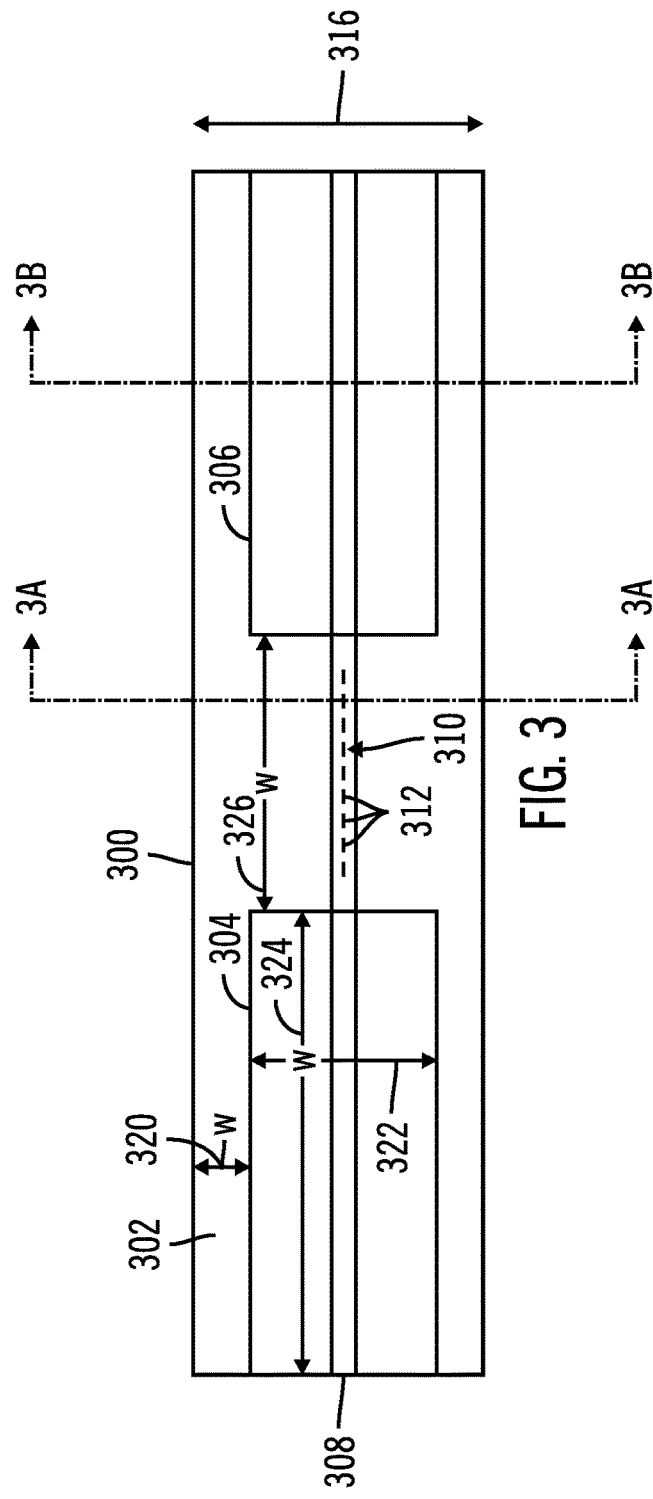

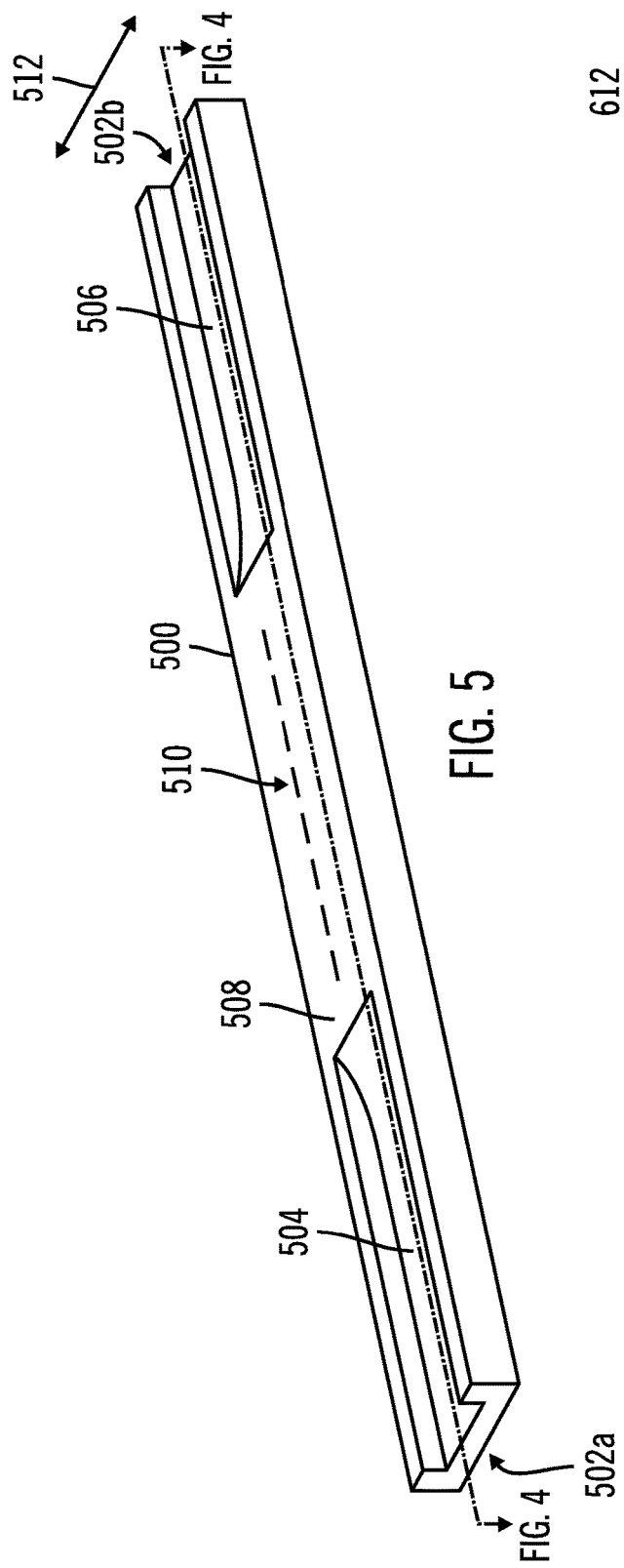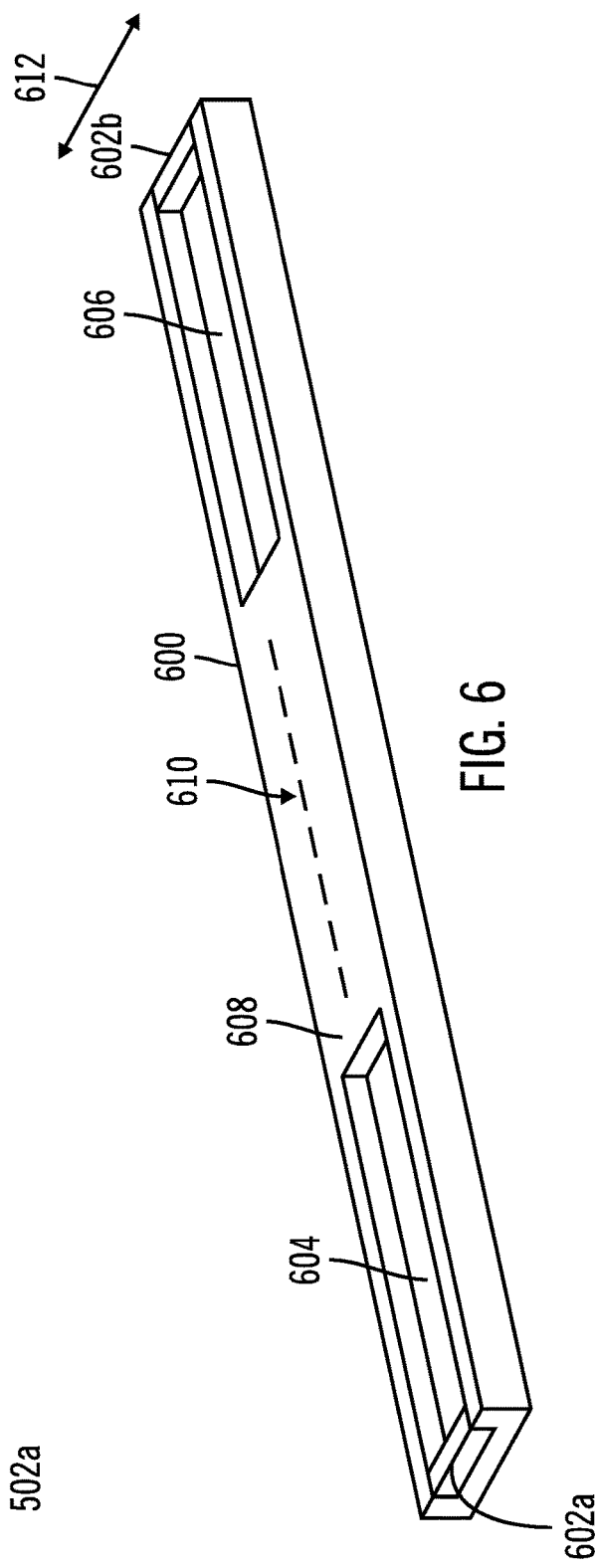

FORMING RECESSED PORTIONS IN A TAPE HEAD MODULE TO PROVIDE AN AIR BEARING BETWEEN A TAPE MEDIUM AND A TAPE BEARING SURFACE OF THE TAPE HEAD MODULE

BACKGROUND OF THE INVENTION

1. Field of the Invention

Provided is method for forming a tape head module having recessed portion to provide air bearing between a tape medium and a tape bearing surface of the tape head module.

2. Description of the Related Art

In magnetic storage systems, data is read from and written onto magnetic recording media utilizing magnetic read and write transducers. Data is written on the magnetic recording media by moving a magnetic recording transducer to a position over the media where the data is to be stored. The magnetic recording transducer generates a magnetic field, which encodes the data into the magnetic media. Data is read from the media by similarly positioning the magnetic read transducer and then sensing the magnetic field of the magnetic media. Read and write operations may be independently synchronized with the movement of the media to ensure that the data can be read from and written to the desired location on the media.

An important and continuing goal in the data storage industry is that of increasing the density of data stored on a medium. For tape storage systems, the goal is to increase track density on the recording tape medium while decreasing the thickness of the magnetic tape medium. In a tape drive system, magnetic tape is moved over the surface of the tape head at high speed. This movement tends to cause formation of a film of air between the head and tape. Usually the tape head is designed to minimize the spacing between the head and the tape. The spacing between the magnetic head and the magnetic tape is crucial so that the recording gaps of the transducers, which are the source of the magnetic recording flux, are close to the tape to effect efficient signal transfer, and so that the read element is close to the tape to provide effective coupling of the magnetic field from the tape to the read element.

However, this close spacing of the tape medium and the tape bearing surface results in various tribological issues becoming more pronounced, among them, tape/head stiction and running friction. Particularly, as the linear density of magnetic tape recording increases, the magnetic spacing must be reduced, requiring smoother heads and tapes. These may be associated with increased startup friction (stiction), increased running friction, and more instantaneous speed variations (ISVs). In addition, tape-head wear may limit tape lifetime, and contact-generated debris can adhere to the head, increasing the magnetic spacing.

There is a need in the art for reducing friction when the tape medium travels across the tape head while ensuring the region of the tape that is subject to read and write operations at the transducer elements comes into contact with the transducer elements to ensure accurate read and write operations to bands of the tape medium.

SUMMARY

Provided is a method for forming a tape head module having recessed portion to provide air bearing between a tape medium and a tape bearing surface of the tape head module. A module of the tape head has a first end, a second end opposite the first end, a first side and a second side, opposite the first side, between the first and the second ends, a tape bearing surface and a second surface, opposite the tape bearing surface, between the first end, the second end, the first side, and the second side. Material is removed from the tape bearing surface of the module to form a first recessed portion between the first end and before a region of the tape bearing surface having an array of transducers, and between the first side and the second side.

BRIEF DESCRIPTION OF THE DRAWINGS

FIG. 2 illustrates an embodiment of a tape head.

FIG. 3 illustrates an embodiment of a top plan view of a module of the tape head.

FIGS. 5-7 illustrate embodiments of a module of the tape head.

DETAILED DESCRIPTION

Described embodiments provide methods to manufacture tape head modules to reduce friction between the tape bearing surface and the magnetic tape medium. Future tape medium may have smoother surfaces to reduce spacing between the tape head and tape medium. Low spacing between the tape head and tape medium is needed to improve areal density and cartridge capacity. Currently, friction is reduced by reducing the tape bearing surface area and by contouring the non-functional portions of the tape head bearing surface, i.e., those portions not including the transducer elements, by using a diamond lapping device to bevel the surface. The beveling may remove material from the edges of the module to create air bearing.

Described embodiments provide methods to manufacture an improved tape head module to reduce friction by vacuum processing recessed portions in the tape bearing surface to cause an air bearing to form between the head and tape in the non-functional regions of the tape bearing surface, those regions not including the transducer read and write elements. This arrangement reduces function and may be manufactured with batch processes, providing faster throughput and lower costs of manufacturing the head. Further, forming the recessed portions within the area of the tape bearing surface retains the skiving edges of the module which is useful for removing debris from the tape medium surface contacting the skiving edges.

Figure 1:
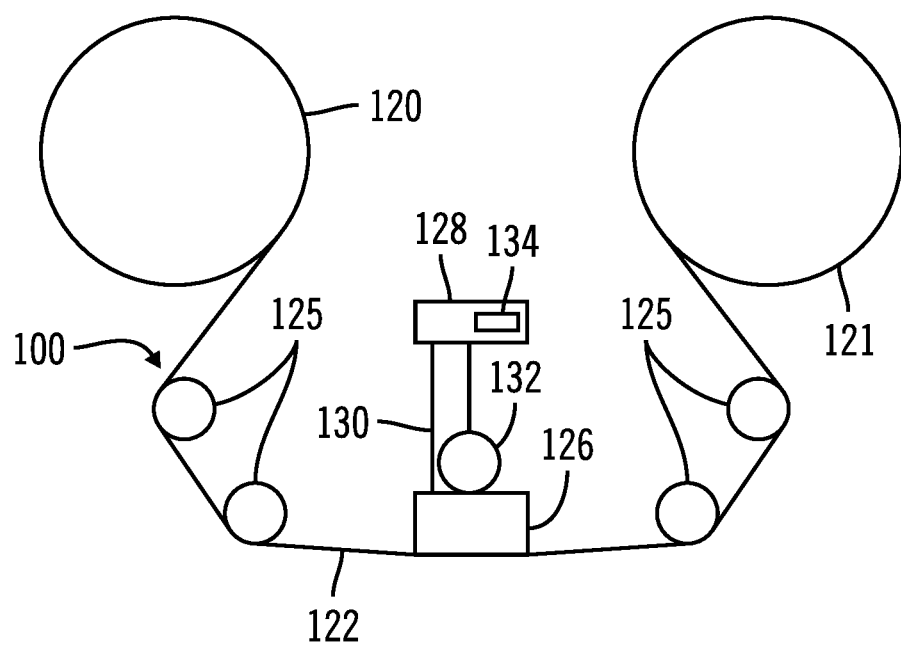
FIG. 1 illustrates an embodiment of a tape drive system in which embodiments are implemented.

FIG. 1 illustrates an embodiment of a tape drive 100 of a tape-based data storage system. A tape supply cartridge 120 and a take-up reel 121 are provided to support a tape 122. One or more of the reels may form part of a removable cassette and are not necessarily part of the system 100. The tape drive 100 may further include drive motor(s) to drive the tape supply cartridge 120 and the take-up reel 121 to move the tape 122 over a tape head 126 of any type. Guides 125 guide the tape 122 across the tape head 126. Such tape head 126 is in turn coupled to a controller assembly 128 via a cable 130. The controller 128 typically controls head functions such as servo following, writing, reading, etc. The cable 130 may include read/write circuits to transmit data to the head 126 to be recorded on the tape 122 and to receive data read by the head 126, which is described below, from the tape 122. An actuator 132 controls position of the head 126 relative to the tape 122.

An interface may also be provided for communication between the tape drive and a host (integral or external) to send and receive the data and for controlling the operation of the tape drive and communicating the status of the tape drive to the host, all as will be understood by those of skill in the art.

FIG. 2 illustrates an embodiment of a magnetic head 200 according to one embodiment of the present invention that includes a first 202, second 204, and third 206 modules each having a flat profile tape bearing surface 208, 210, 212 respectively. During operation, a layer of air will introduced between a tape medium 214 and a portion of the tape bearing surfaces 208, 201, 212, referred to as an air bearing, to avoid friction between the tape medium 214 and the tape bearing surfaces 208, 210, 212. A portion of the tape will contact the tape bearing surfaces 208, 210, 212 at the location of the read and write elements, and other portions of the tape medium 214 will ride above the tape bearing surface on a layer of air, sometimes referred to as an "air bearing". The first module 202 may comprise a "leading" module as it is the first module encountered by the tape in a three module design for tape. The third module 206 may be referred to as a "trailing" module. The trailing module follows the middle module 204 and is the last module seen by the tape in a three module design. The leading and trailing modules 202, 206 are referred to collectively as outer modules. The outer modules 202, 206 may alternate as leading modules, depending on the direction of travel of the tape 214.

In one embodiment, the tape bearing surfaces 208, 210, 212 of the first, second and third modules 202, 204, 206, respectively, lie on parallel planes such that the tape bearing surfaces 208, 210, 212 are flush with each other on a same plane.

During operations, only a portion of the tape 214 is in contact with the tape bearing surface 208, 210, 212, constantly or intermittently, and other portions of the tape ride above the tape bearing surface on a layer of air, sometimes referred to as an "air bearing". In described embodiments, the tape 214 is in contact with the tape bearing surface 208, 210, 212 in functional regions including the read, write and/or servo transducers and will be separated from the tape bearing surface 208, 210, 212 in non-functional areas of the tape bearing surface 208, 210, 212 not including the transducers.

In the embodiment of FIG. 2, the first 202, second 204, and third 206 modules may each have a closure 216, 218, 220, respectively, which extends the tape bearing surface of the associated module to position the read/write elements away from the edge of the tape bearing surfaces. The closure 218 on the second module 204 can be a ceramic closure of a type typically found on tape heads. The closures 216, 220 of the first 202 and third 206 modules may be shorter than the closure 218 of the second module 204 as measured parallel to a direction of tape travel over the respective module. This enables setting the modules closer together.

In certain embodiments, the transducer array of readers, writers and servo readers may be located on an edge 222, 224, 226 of the module 202, 204, 206 between the closures 216, 220, 220.

FIG. 3 illustrates a top plan view of an embodiment of a module 300, such as one of the modules 202, 204, 206, having a tape bearing surface 302 with a first recessed portion 304 and second recessed portion 306 formed in the tape bearing surface 300. The module 300 has a gap 308 formed in an electrically conductive substrate extending the length of the module 300 and a transducer array section 310 including read, write, and/or server transducers 312. The transducer array section 310 is on the tape bearing surface 302 between the recessed portions 304 and 306. The tape medium 314 (shown in FIG. 4) moves across the module 300 in a forward or reverse direction indicated by the arrow 316.

One or more of the modules 202, 204, and 206 may include the recessed portions 304, 306 to cause the air bearing. In certain embodiments, all the modules 202, 204, 206 may include the recessed portions 304, 306. Further, a tape head can include multiple instances of the module 300, as shown in FIG. 2.

Figure 3A:
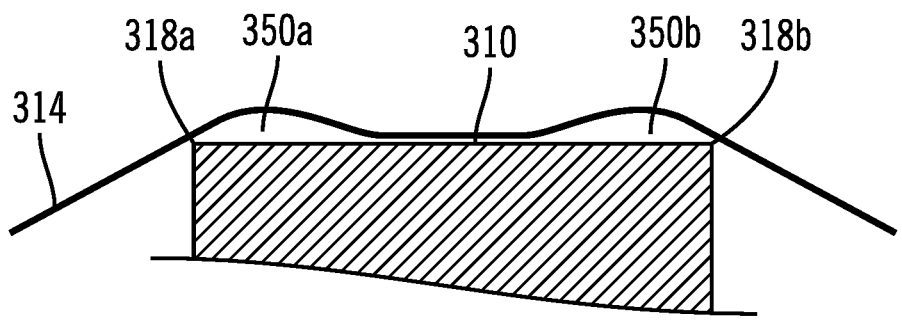
FIGS. 3a and 3b illustrate cross sectional views of the module taken along a plane as shown in FIG. 3
Figure 3B:
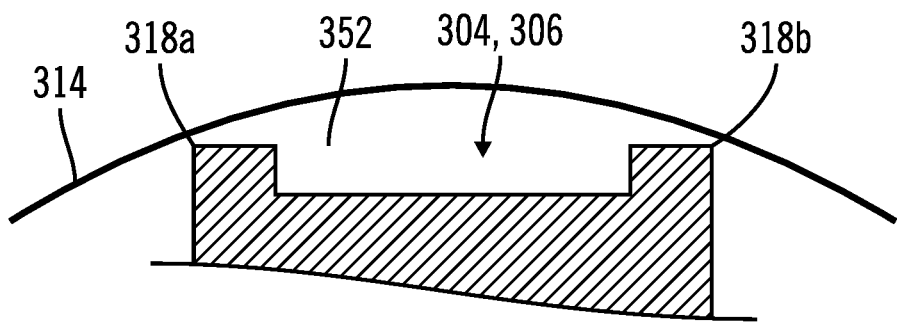

By way of example, in certain implementation, a closure width 320 between an edge of the module 300 and the edge of recessed portion 304, 306, and may be from 15 to 25 microns (μm). The width 322 of the recessed portions 304, 306 may approximately be 160 μm wide and the length 324 may approximately be 8 to 9.2 millimeters (mm). The depth of the recessed portions 304, 306 may approximately be from 5 to 52 μm. The distance 326 between the recessed portions 304 and 306 may be approximately 6 mm. In alternative embodiments, different dimensions for these sections may be used FIGS. 3a and 3b show a cross-section taken along the lines 3a and 3b in FIG. 3, respectively. FIG. 3a shows the cross-section in the transducer array section 310 and shows the tape 314 passing over the transducer array section 310 that comes into contact with the transducers 312 as a result of a vacuum in the transducer array section 310. A spacing of air bearing 350a, 350b is formed where the tape traverses across the edges 318a, 318b of the module 300.

FIG. 3b shows a cross section in a recessed portion 304, 306, and shows that while the tape 314 is passing over the recessed portions 304, 306, air flows into the recessed portions 304, 306 that forms a spacing of air 352 between the tape 314 and the tape bearing surface 302 in the area of the recessed portions 304, 306. The spacing of air 352 is formed as a result of the air bearing formed by air flowing into the recessed portions 304, 306. In this way, friction is eliminated along most parts of the tape bearing surface 302 except the region of the transducer array section 310.

FIGS. 3a and 3b show tape bearing surface 302 has sharp skiving edges 318a, 318b. The tape 314 comes into contact with the skiving edges 318a, 318b, which scrapes debris off the tape 314 surface as the tape 314 passes over the edges 318a, 318b. Removing debris from the tape 314 surface avoids introduction of errors during read and write operations from debris on the tape 314 surface. Further, when the tape 314 comes into contact with the skiving edges 318a, 318b, a space is formed 350a, 350b, 352, which creates an air bearing and space along most of the tape bearing surface 302, including the area over and adjacent to the recessed portions 304, 306. This space 350a, 350b, 352, eliminates friction over most of the tape bearing surface 302, except at the area of the transducer array section 310 where atmospheric pressure pushes the tape 314 into contact with the tape bearing surface 302 to allow the elements in the transducer array 312 to contact the tape 314 to perform read and write operations with respect to the tape 314 medium.

Figure 4:
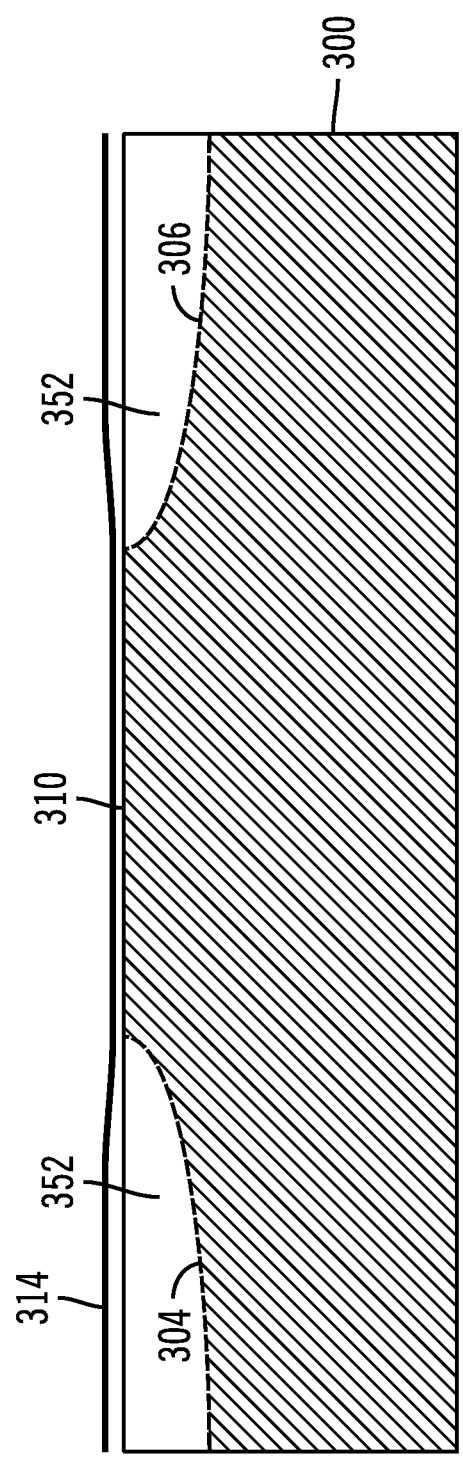
FIG. 4 illustrates a cross sectional view of the module taken along a plane as shown in FIG. 5.

FIG. 4 illustrates a cross section of the module 300 of FIG. 3, taken along the horizontal length of the module 500 along a cross section shown in FIG. 5, showing how the tape 314 passes over the module 500 with an air bearing 352 between the tape while the tape 314 passes over the recessed portions 304, 306, also shown in FIG. 3b. The tape 314 passes over the module 300 in the directions 316. A vacuum causes the tape 314 to contact the transducer array section 310 to allow the elements in the transducer array section 310, as shown in FIG. 3a, to transfer signals with the tape medium 314 to perform read, write, and/or servo operations with respect to the tape 314 medium. Servo readers are used to position the head during read and write operations.

Figure 7:
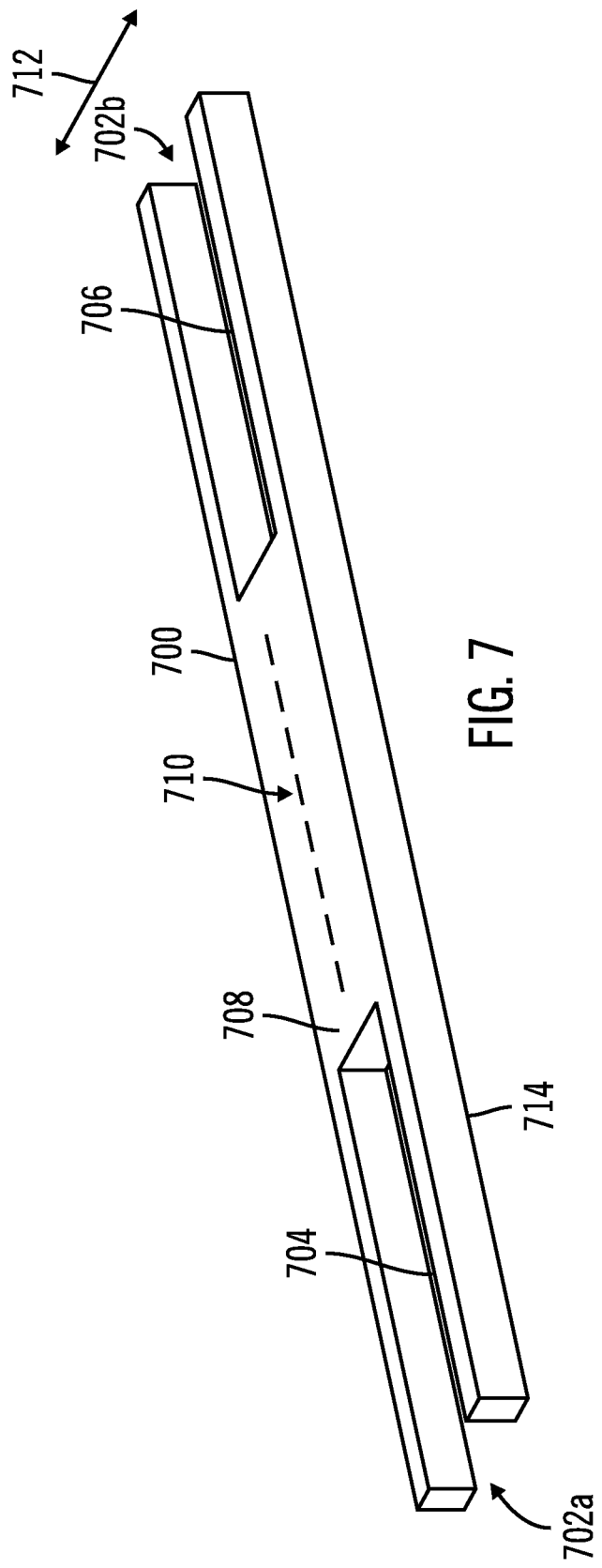

FIGS. 5-7 illustrate different embodiments of the module 300 of FIG. 3 having different arrangements for the recessed portions. FIG. 5 shows the module 500 having open sides 502a, 502b in the recessed portions 504, 506 that allow air to flow directly into the recessed portions 504, 506 while the tape 314 is traversing over a tape bearing surface 508 in the directions 512. The transducer array section 510 includes read, write and/or servo elements to perform read and write operations with respect to the tape medium 314 moving across the module 500 in the directions 512. In FIG. 5, the ends of the recessed portions 504, 506 near the transducer array section 510 curve upward.

FIG. 6 shows the module 600 having side walls 602a, 602b of the recessed portions 604, 606. The transducer array section 610 includes read, write and/or servo elements to perform read and write operations with respect to the tape medium 314 moving across the tape bearing surface 608. Air would flow into the recessed portions 604, 606 through an area where the tape 314 scrapes off the edges 318a, 318b, such as the space 320 shown in FIG. 4. Further, air may flow into a recessed portion 604, 606 if the entire width of the tape does not extend over the entire recessed portion 604, 606 leaving an opening to the recessed portion 604, 606. This air flow into the recessed portions 604, 606 allows an air bearing and space 352 (FIG. 4) to form between the tape 314 and tape bearing surface 602 along most of the length of the tape bearing surface 602. In FIG. 6, the ends of the recessed portions 605, 606 near the transducer array section 610 form a wall orthogonal with respect to the bottom of the recessed portions 604, 606.

FIG. 7 shows the module 700 having open sides 702a, 702b and recessed portions 704, 706 that comprise openings extending from the tape bearing surface 708 to an opposite surface 714 of the module 700. The openings 704, 706 allow air to flow directly into the recessed portions 704, 706 from both surfaces 708, 714 of the module 700 while the tape 314 is traversing over the tape bearing surface 702 in the directions 712. The transducer array section 710 includes read, write and/or servo elements to perform read and write operations with respect to the tape medium 314 moving across the module 700 in the directions 712.

Figure 8:
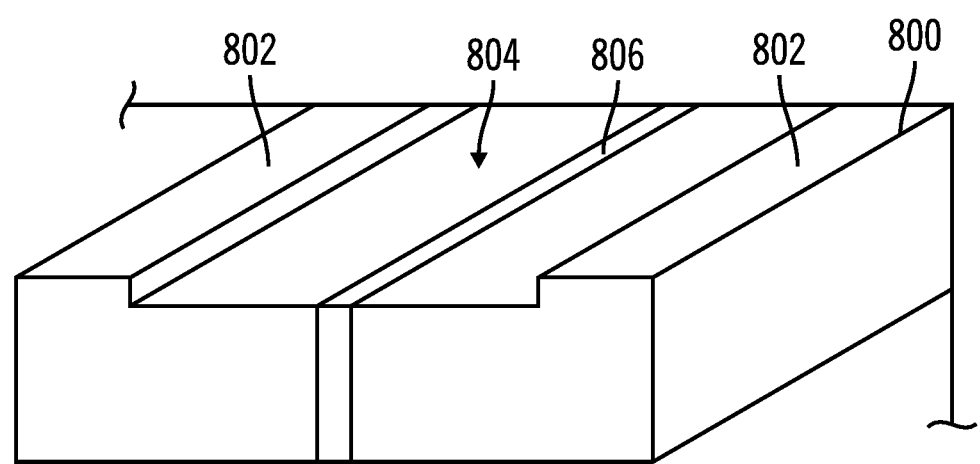
FIG. 8 illustrates an embodiment of a side of a module of the tape head.

FIG. 8 provides another perspective of the module 800, such as module 500 in FIG. 5, including tape bearing surface 802 with a recessed portion 804, where a gap 806 extends through the recessed portion 804, such as the gap 308 in FIG. 3. The transducer array, such as array 510 shown in FIG. 5 between the recessed portions 504, 506, would be located in the gap 806 on the tape bearing surface 802 after the recessed portion 804.

Described embodiments provide tape head modules with recessed portions formed on each side of the transducer array elements to allow air to flow into the module to form an air bearing between the tape medium and the non-functional regions of the tape bearing surface. Further, with described embodiments, the edges of the module are retained to allow for skiving of debris from the tape medium as the tape traverses the modules.

Further embodiments provide techniques to form the recessed portions in the tape bearing surface of the tape head modules.

Figure 9:
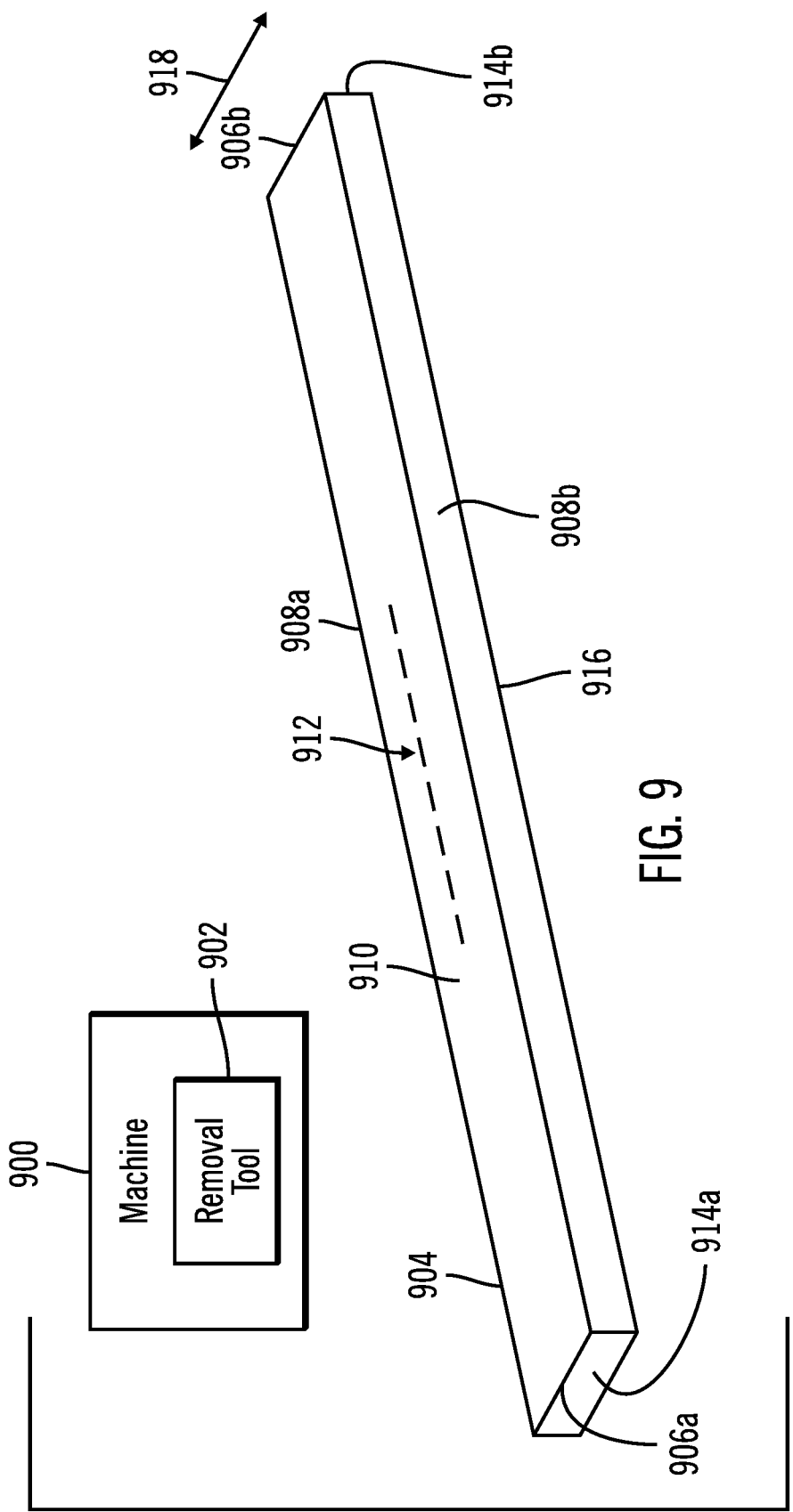
FIG. 9 illustrates an embodiment of a machine tool for forming recessed portions in a tape head module.

FIG. 9 provides an embodiment of a machine 900 having a removal tool 902 to remove material from a tape head module 904 to form the recessed portions shown in the embodiments of FIGS. 3, 3A, and 4-8. The machine 900 may comprise a dicing system and the removal tool 902 a dicing saw suitable for dicing silicon, gallium arsenide, glass, ceramics, etc. An example of a suitable dicing system comprises Manufacturing Technology Inc.'s NSX-250 Dicing Saw. In alternative embodiments, the removal tool 902 may comprise other types of saws suitable for removing material from a tape head module, such as an air spindle saw. In further embodiments, the machine 900 may comprise an ion-milling machine and the removal tool 902 a wide beam ion source that accelerates ions of an inert gas onto the tape bearing surface of the module 904 to etch away material to form the recessed portions. In a further embodiment, the machine 900 may comprise a Reactive Ion Etching (RIE) machine. In yet further embodiments, other suitable machines and removal tools for removing material from a silicon wafer may be used.

The module 904 has a first end 906a, a second end 906b, a first side 908a, a second side 908b, a tape bearing surface 910 and a surface 916 opposite the tape bearing surface. A region of an array of transducers 912 is also formed on the module 904. A tape medium travers the module 904 in the directions 918

The machine 900 may be programmed to operate the removal tool 902 to remove material from the tape bearing surface 910 to form the recessed portions. In further embodiments, the machine 900 and removal tool 902 may be machine controlled by a person or robot at a control panel of the machine 900.

Figure 10:
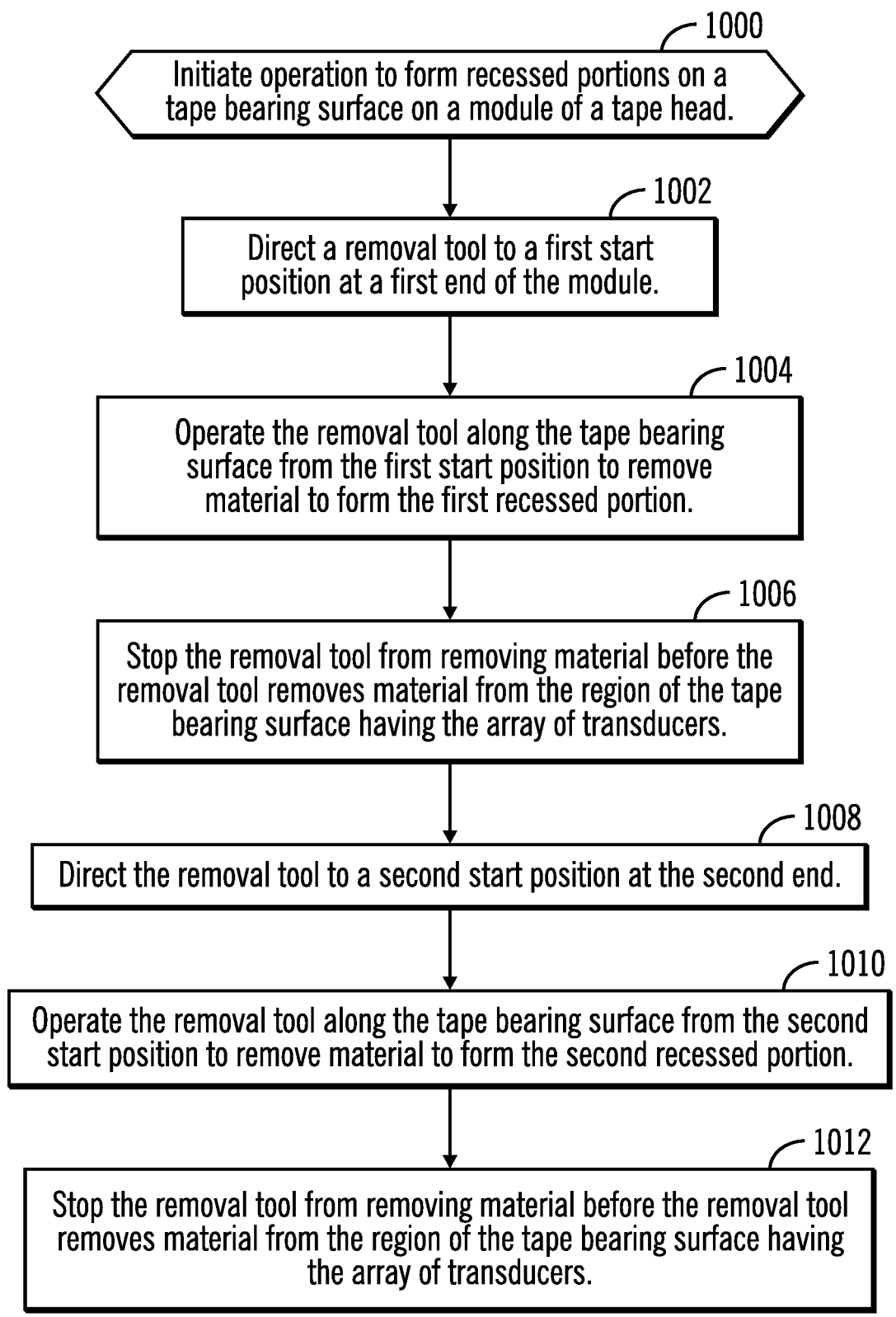
FIG. 10 illustrates an embodiment of operations to form recessed portions on a tape bearing surface of a tape head module.

FIG. 10 is an embodiment of operations performed by the machine 900 to form the recessed portions, such as recessed portions 304, 306 (FIGS. 3, 4), 504, 506 (FIG. 5), 604, 606 (FIG. 6), on the tape bearing surface 906. Upon initiating (at block 1000) the operation to form the recessed portions, the machine 900 directs (at block 1002) the removal tool 902, such as a saw or ion source, to a first start position at a first end 906a of the module 904. The machine 900 operates (at block 1004) the removal tool 902 along the tape bearing surface 910 from the first start position 906a to remove material to form the first recessed portion. The removal tool 902 is stopped (at block 1006) from removing material before the removal tool removes material from the region of the tape bearing surface having the array of transducers 912. The machine 900 further directs (at block 1008) the removal tool 902 to a second start position at the second end 906b and operates (at block 1010) the removal tool 902 along the tape bearing surface 910 from the second start position to remove material to form the second recessed portion. The machine 900 stops (at block 1012) the removal tool 902 from removing material before the removal tool 902 removes material from the region of the tape bearing surface having the array of transducers 912.

In one embodiment, the removal tool 902 may comprise an ion milling tool to remove material by etching the tape bearing surface 910 to form the recessed portions. Alternatively, the removal tool 902 may comprise a saw that cuts material from the tape bearing surface 910 to form the recessed portions. In one embodiment, the start positions may be at the first 906a and second 906b ends external to the module so that the removal tool 902 removes material from a first side wall 914a at the first end 906a and a second side wall 914b at the second end 906b to form the recessed portions 502a, and 502b in FIG. 5 where material from the side walls 914a, 914b is removed to form openings 702a, 702b (FIG. 7) open to a space external to the module 904. In an alternative embodiment, the start positions may start an offset on the tape bearing surface 910 from the ends 906a, 906b. In such case, the side walls 602a, 602b would be left intact as shown in FIG. 6.

Figure 11:
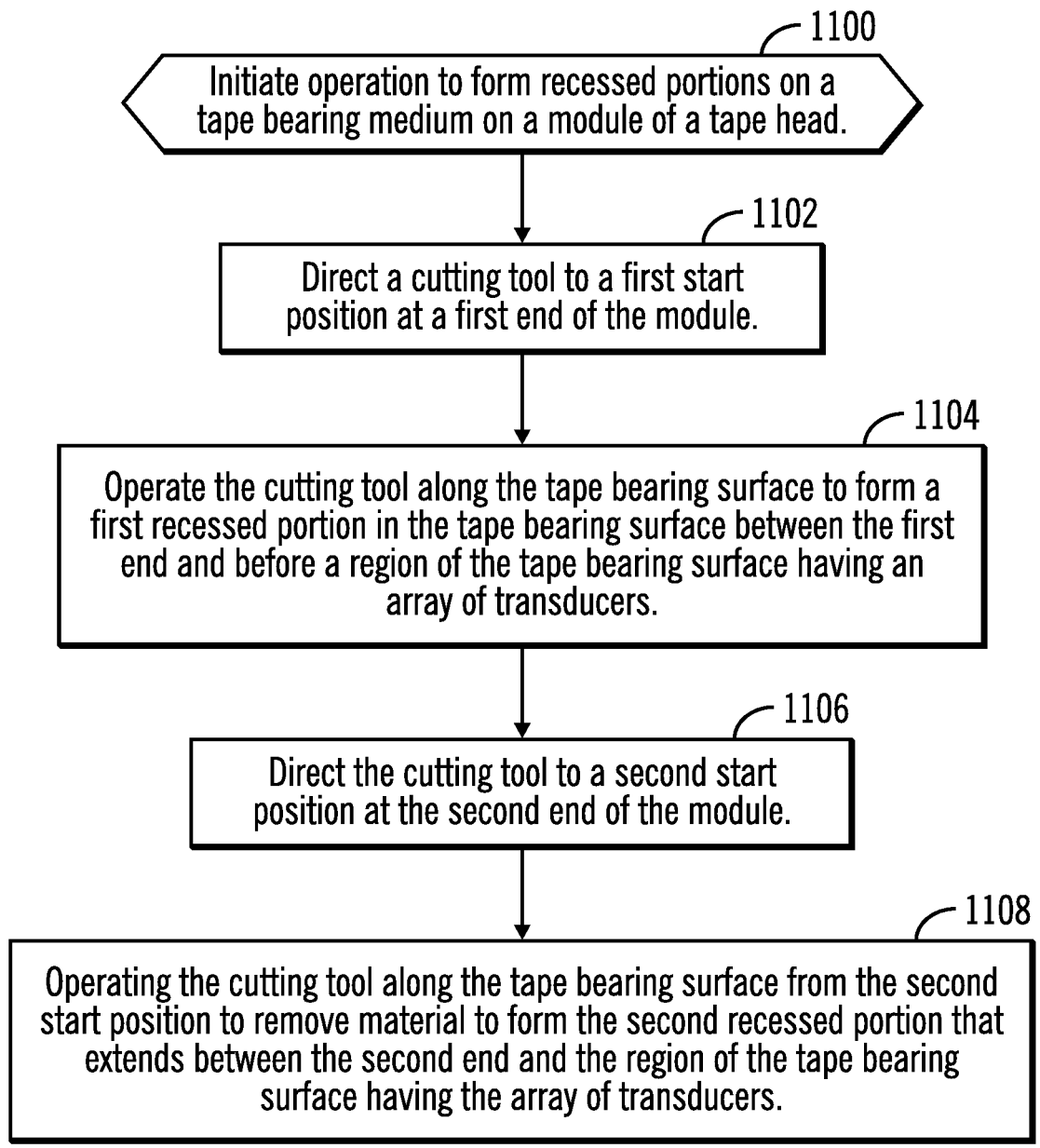
FIG. 11 illustrates an embodiment of operations using a cutting tool to form recessed portions on a tape bearing surface of a tape head module.
Figure 12:
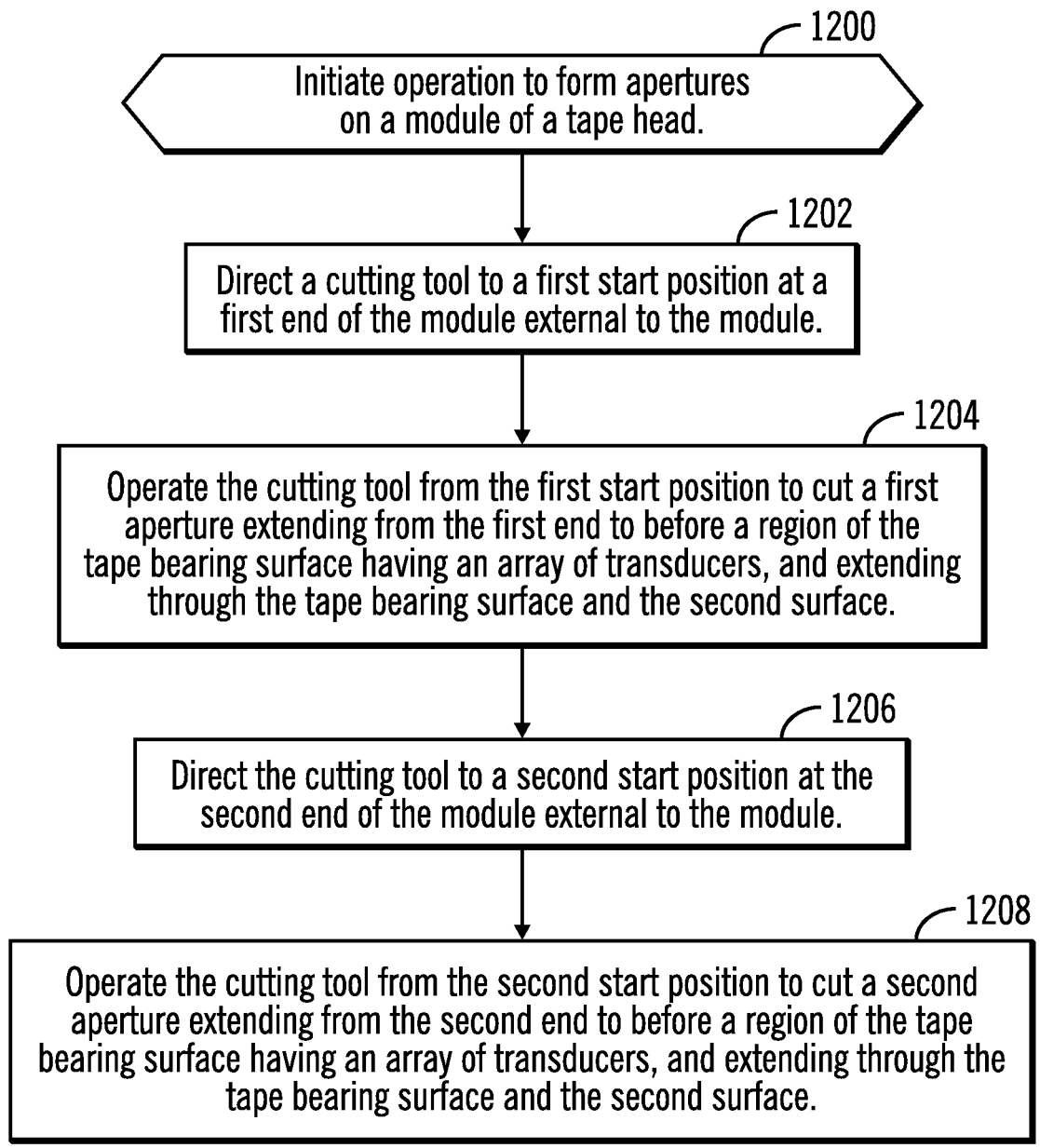
FIG. 12 illustrates an embodiment of operations using a cutting tool to form apertures in the tape head module.

FIG. 11 illustrates an embodiment of operations performed by the machine 900 to form the recessed portions, such as recessed portions 304, 306 (FIGS. 3, 4), 504, 506 (FIG. 5), 604, 606 (FIG. 6), on the tape bearing surface 906 when the removal tool 902 comprises a saw, such as a dicing saw. Upon initiating (at block 1100) the operations to form the recessed portions, the machine 900 directs (at block 1102) the removal tool 902 comprising a cutting tool to a first start position at a first end 906a of the module 904 and operates (at block 1104) the cutting tool 902 along the tape bearing surface 910 to form a first recessed portion in the tape bearing surface between the first end and before a region of the tape bearing surface having an array of transducers. The machine 900 directs (at block 1106) the cutting tool to a second start position at the second end 906b of the module 904 and operates (at block 1108) the cutting tool 902 along the tape bearing surface 910 from the second start position to remove material to form the second recessed portion that extends between the second end 906b and the region of the tape bearing surface having the array of transducers 912.

If the cutting tool 902 start positions are located external to the module, then the first 504 and second 506 recessed portions are formed as shown in FIG. 5 having openings 502a, 502b to a space external to the module 500. However, if the start positions are located on the tape bearing surface 910, such as an offset away from the ends 906a, 906b, then the recessed portions 604, 606 may be formed as shown in FIG. 6 with the side wall 602a, 602b retained.

In one embodiment, the dicing saw 902 may have a width equivalent to a width of the first and the second recessed portions. Further, the cutting tool 902 may operate by performing a plunge cut where the cutting tool 902 or dicing saw is placed in the middle of the recessed portions 504, 506 (FIG. 5) and 604, 606 (FIG. 6) to be formed. In alternative embodiments, other cutting techniques may be used, such as, but not limited to, ion milling and reactive ion etching.

FIG. 11 illustrates an embodiment of operations performed by the machine 900 to form apertures 702a, 702b in the module 700 as shown in FIG. 7 when the removal tool 902 comprises a saw, such as a dicing saw. Upon initiating (at block 1200) the operations to form the recessed portions, the machine 900 directs (at block 1202) the cutting tool 902 to a first start position at a first end 906a of the module 904 external to the module. The machine 900 operates (at block 1204) the cutting tool 902 from the first start position to cut a first aperture 704 extending from the first end to before a region of the tape bearing surface having an array of transducers 710, and extending through the tape bearing surface 708, 910 and the second surface 714, 916. After cutting the first aperture, the machine 900 directs (at block 1206) the cutting tool 902 to a second start position at the second end 906b of the module 904 external to the module 904 and operates (at block 1208) the cutting tool 902 from the second start position to cut a second aperture 706 extending from the second end 906b to before a region of the tape bearing surface having an array of transducers 912, and extending through the tape bearing surface 910 and the second surface 916.

In one embodiment, the dicing saw 902 may have a width equivalent to a width of the first and the second apertures 704, 706. Further, the cutting tool 902 may operate by performing a plunge cut where the cutting tool 902 or dicing saw is placed in the middle of the region to be cut. In alternative embodiments, other cutting techniques may be used, such as, but not limited to ion milling and reactive ion etching.

Figure 13A:
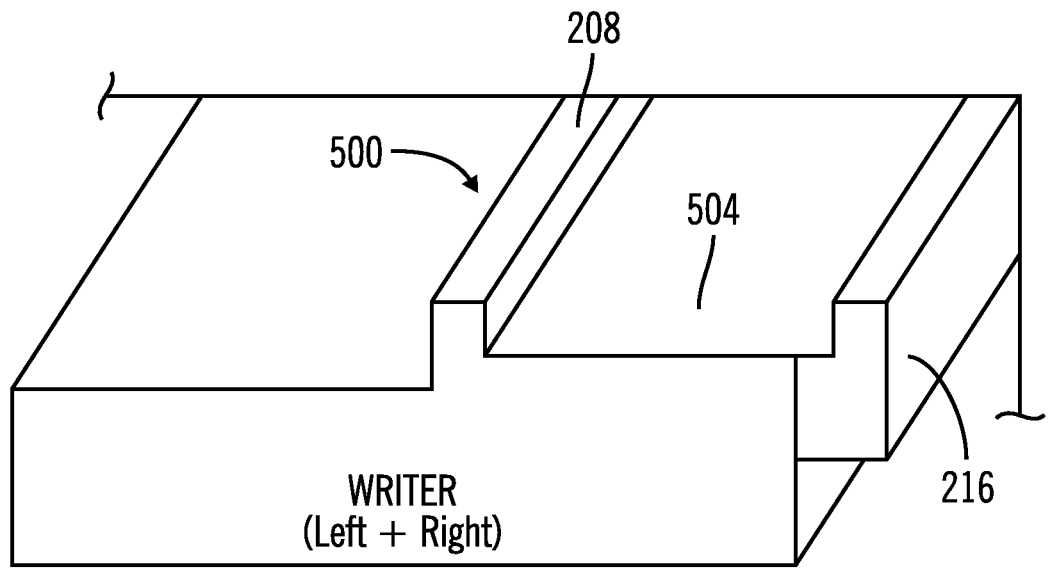
FIGS. 13a, 13b, and 13c illustrate an embodiment of a module of the tape head.
Figure 13B:
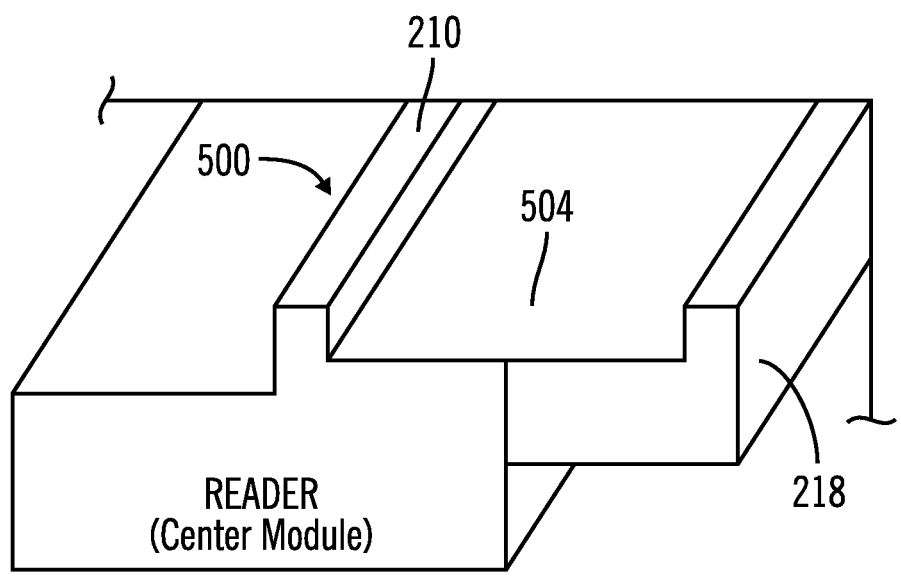
Figure 13C:
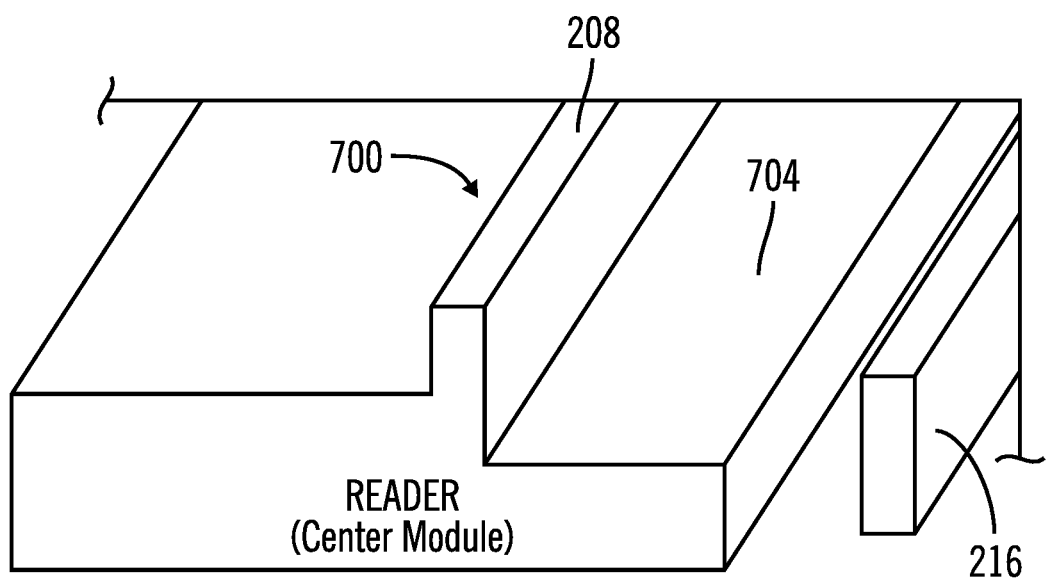

FIGS. 13a, 13b, and 13c illustrate embodiments of a module, such as the modules 500, 600, 700, 800 in FIGS. 5, 6, 7, and 8, implemented in the tape bearing surface 208, 210, and 212 and closure 216, 218, and 220 as shown in FIG. 2. FIG. 13a shows an embodiment of the module 500, where the recessed portion 504 is shown and the module 500 is shown formed in the tape bearing surface 208 and the closure 216. The module 500 in FIG. 13a may comprise a writer. FIG. 13a shows the write module 208, 216 in FIG. 2. Further the side module 212 and 220 in FIG. 2 may also have the arrangement shown in FIG. 13a.

FIG. 13b shows an embodiment of the module 500, where the recessed portion 504 is shown and the module 500 is shown formed from the tape bearing surface 210 and closing 218. The module 500 in FIG. 13a may comprise the center reader module.

FIG. 13c shows an embodiment of the module 700 (FIG. 7), where the recessed portion 704 is shown and the module 700 is shown formed from the tape bearing surface 210 and closure 218.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A method for manufacturing a tape head for reading and writing with respect to a tape medium traversing across the tape head, comprising:
   providing a module of the tape head having a first end, a second end opposite the first end, a first side and a second side, opposite the first side, between the first and the second ends, a tape bearing surface and a second surface, opposite the tape bearing surface, between the first end, the second end, the first side, and the second side;
   directing a removal tool to a first start position;
   operating the removal tool along the tape bearing surface from the first start position to remove material to form a first recessed portion between the first end and before a region of the tape bearing surface having an array of transducers, and between the first side and the second side; and
   stopping the removal tool from removing material before the removal tool removes material from the region of the tape bearing surface having the array of transducers.

2. The method of claim 1, further comprising:
   removing material from the tape bearing surface to form a second recessed portion between the second end and before the region of the tape bearing surface having the array of transducers, and between the first side and the second side.

3. The method of claim 2,
   wherein the removing the material to form the second recessed portion comprises:
   directing the removal tool to a second start position;
   operating the removal tool along the tape bearing surface from the second start position to remove material to form the second recessed portion; and
   stopping the removal tool from removing material before the removal tool removes material from the region of the tape bearing surface having the array of transducers.

4. The method of claim 3, wherein the removal tool from the first start position removes material from a first side wall on the first side to form the first recessed portion, and wherein the removal tool from the second start position removes material from a second side wall on the second side to form the second recessed portion, wherein the first and the second recessed portions are configured to open to a space external to the module while a tape medium is traversing the tape bearing surface.

5. The method of claim 3, wherein the removal tool from the first start position removes material from the tape bearing surface at an offset from the first end and wherein the removal tool from the second start position removes material on the tape bearing surface at an offset from the second end.

6. The method of claim 3, wherein the removal tool performs one of ion milling and reactive ion etching to remove material from the tape bearing surface to form the first and the second recessed portions.

7. The method of claim 3, wherein the removal tool comprises a dicing saw to cut through the tape bearing surface to form the first and the second recessed portions.

8. A method for manufacturing a tape head for reading and writing with respect to a tape medium traversing across the tape head, comprising:
   providing a module of the tape head including a first end, a second end opposite the first end, a first side, a second side opposite the first side, the first side and the second side extending between the first and second ends, a tape bearing surface between the first end, the second end, the first side, and the second side, and a transducer array region on the tape bearing surface; and
   directing a removal tool to a first position and operating the removal tool along the tape bearing surface to remove material to form a first recessed portion, wherein at least some of the material removed is located between the first end and the transducer array region, and stopping the removal tool from removing material before the removal tool removes material from the transducer array region.

9. The method of claim 8, further comprising:
   removing material from the tape bearing surface to form a second recessed portion between the second end and the transducer array region, and between the first side and the second side.

10. The method of claim 9, wherein the removing the material to form the second recessed portion comprises directing a removal tool to a second position and operating the removal tool along the tape bearing surface to remove material to form the second recessed portion, wherein at least some of the material removed is located between the second end and the transducer array region, and stopping the removal tool from removing material before the removal tool removes material from the transducer array region.

11. The method of claim 8, wherein the removal tool from the first position removes material from a first side wall on the first side and moves towards the transducer array region to form the first recessed portion, wherein the first recessed portion is configured to open to a space external to the module while a tape medium is traversing the tape bearing surface.

12. The method of claim 8, wherein the removal tool from the first position removes material from the tape bearing surface at an offset from the first end.

13. The method of claim 8, wherein the removal tool performs one of ion milling and reactive ion etching to remove material from the tape bearing surface to form the first recessed portion.

14. The method of claim 8, wherein the removal tool comprises a dicing saw to cut through the tape bearing surface to form the first recessed portion.

15. A method for manufacturing a tape head for reading and writing with respect to a tape medium traversing across the tape head, comprising:

providing a module of the tape head including a first end, a second end opposite the first end, a first side, a second side opposite the first side, the first side and the second side extending between the first and second ends, a tape bearing surface between the first end, the second end, the first side, and the second side, and a transducer array region on the tape bearing surface;

removing material along the tape bearing surface from a region between the first end and the transducer array region; and removing material along the tape bearing surface from a region between the second end and the transducer array region;

wherein the removing material along the tape bearing surface from a region between the first end and the transducer array region includes directing a removal tool to a first position and operating the removal tool along the tape bearing surface to remove material, wherein at least some of the material removed is located between the first end and the transducer array region, and stopping the removal tool from removing material before the removal tool removes material from the transducer array region.

16. The method of claim 15, wherein the removing material along the tape bearing surface from a region between the second end and the transducer array region includes directing a removal tool to a second position and operating the removal tool along the tape bearing surface to remove material, wherein at least some of the material removed is located between the second end and the transducer array region, and stopping the removal tool from removing material before the removal tool removes material from the transducer array region.

17. The method of claim 15, wherein the removal tool is controlled to remove material from a first side wall on the first side.

18. The method of claim 15, wherein the removal tool performs one of ion milling and reactive ion etching to remove material from the tape bearing surface.

19. The method of claim 15, wherein the removal tool comprises a dicing saw to remove material from the tape bearing surface.

20. The method of claim 15, wherein the removal tool from the first position first removes material from the tape bearing surface at a position spaced apart from the first end.

* * * * *